United States Patent [19]

Brindoepke et al.

[11] Patent Number: 5,391,613
[45] Date of Patent: Feb. 21, 1995

[54] UNSATURATED POLYURETHANES, AND THE USE THEREOF AS REACTIVE EMULSIFIERS

[75] Inventors: Gerhard Brindoepke, Sulzbach; Joachim Zoeller, Mainz, both of Germany

[73] Assignee: Hoechst AG, Germany

[21] Appl. No.: 205,606

[22] Filed: Mar. 3, 1994

[30] Foreign Application Priority Data

Mar. 5, 1993 [DE] Germany ............................ 4306947

[51] Int. Cl.$^6$ ............................................. C08G 18/04
[52] U.S. Cl. ................................. 524/591; 524/839; 524/840; 528/49
[58] Field of Search ................. 524/591, 839, 840; 528/49

[56] References Cited

FOREIGN PATENT DOCUMENTS 1309045 3/1973 United Kingdom .
1520940 8/1978 United Kingdom .

*Primary Examiner*—Maurice J. Welsh
*Attorney, Agent, or Firm*—Bierman and Muserlian

[57] ABSTRACT

Unsaturated polyurethanes, and the use thereof as reactive emulsifiers

Unsaturated polyurethanes which contain from 20 to 80% by weight of polyethylene glycol units and can be prepared by reacting a) at least one organic polyisocyanate,
 b) an unsaturated fatty alcohol, a polyalkylene glycol ether thereof or an unsaturated acid ester containing one hydroxyl group,
 c) one or more diols which additionally contain at least one further hydroxyl group or carboxyl group and
 d) a polyethylene glycol having a molecular weight in the region of 750 to 10,000, with maintenance of an NCO/OH equivalent ratio, based on all the starting components a) to d), of from 0.7:1 to 1.2:1.

These unsaturated polyurethanes are used as reactive emulsifiers for the preparation of dispersions of hydrophobic synthetic resins which can be cured by means of free radicals and/or oxidatively.

8 Claims, No Drawings

UNSATURATED POLYURETHANES, AND THE USE THEREOF AS REACTIVE EMULSIFIERS

The invention relates to novel, hydrophilically modified, olefinically unsaturated polyurethanes, to the use thereof as reactive emulsifiers for hydrophobic synthetic resins which can be cured by means of free radicals and/or oxidatively in the preparation of aqueous synthetic resin dispersions, and to coating compositions whose binders essentially comprise such dispersions.

Water-dispersible polyurethanes containing double bonds have already been disclosed (cf. for example, EP-A 0 098 752 and DE-A 29 36 039). The hydrophilicity of these known systems is based on the presence of ionic centers, in particular carboxylate or sulfonate groups, which contain alkali metal cations or ammonium ions as counterions which remain in the ultimate coatings produced from these systems and considerably impair the water resistance thereof. In addition, the amines frequently present can cause yellowing of the paint coatings.

DE-A 38 29 588 describes water-dispersible allyl urethanes which may also contain unsaturated dicarboxylic acid radicals. The water-dispersibility is achieved here by the incorporation of a specific combination of polyethylene glycols. However, the relatively high content of polyethylene glycols gives binders having inadequate paint-film properties.

Another way of achieving water-dilutable products comprises using external emulsifiers. Thus, according to U.S. Pat. No. 4,070,323, for example, acryloyl group-containing polyurethanes are dispersed in water with the aid of anionic or cationic oil-in-water emulsifiers (for example sodium laurylsulfate). These emulsifiers are not incorporated into the paint film during free-radical crosslinking. The degree of water resistance which can be achieved by the paint films is consequently reduced to a not insignificant extent.

DE-A-39 00 257 describes nonionic, linear, hydrophilic (meth)acryloyl group-containing polyurethanes and the use thereof as reactive emulsifiers for non-water-dispersible urethane(meth) acrylates. However, these emulsifiers only allow emulsification of a limited number of synthetic resins; thus, they are not capable, for example, of emulsifying styrene-free, unsaturated polyester resins. DE-40 04 651 describes air-drying polyurethane resins which contain both polyols and monoalcohols containing air-drying groups into which up to 40% of conventional alkyd resins can be emulsified. EP-A-0 501 247 describes olefinically unsaturated polyurethanes which contain a $\beta,\gamma$-ethylenically unsaturated ether alcohol component and which can be employed as reactive emulsifiers for unsaturated polyester resins.

The object of the present invention was to develop emulsifiers which are capable of transferring a wide range of binders to the aqueous phase and which do not adversely affect the film properties, in particular with respect to gloss and water resistance.

This object has been achieved through the provision of the hydrophilic polyurethanes according to the invention described in greater detail below.

The invention relates to unsaturated polyurethanes containing 20–80% by weight of polyethylene glycol units and obtainable by reacting a) at least one organic polyisocyanate, b) an unsaturated fatty alcohol, a polyalkylene glycol ether thereof, or an unsaturated acid ester containing one hydroxyl group, c) one or more diols which additionally contain at least one further hydroxyl group or carboxyl group, and d) a polyethylene glycol having a molecular weight in the range from 750 to 10,000, with maintenance of an NCO/OH equivalent ratio, based on all the starting components a) to d), of from 0.7:1 to 1.2:1.

The invention also relates to the use of these polyurethanes according to the invention as reactive emulsifiers in the preparation of aqueous synthetic resin dispersions for non-water-dispersible synthetic resins which can be cured by means of free radicals and/or oxidatively.

The polyurethanes according to the invention are essentially products of the reaction of the abovementioned starting components a) to d), the polyurethanes preferably being prepared using from 0.1 to 1 mol of component b), from 0.1 to 1 mol of component c) and from 0.1 to 0.7 mol of component d) per mol of component a).

Component a) comprises at least one organic polyisocyanate. Suitable polyisocyanates are any organic polyisocyanates known per se from polyurethane chemistry which contain aliphatically, cycloaliphatically and/or aromatically bonded isocyanate groups and preferably have a molecular weight of from 168 to 1,000, preferably from 168 to 300. Examples of suitable polyisocyanates are 1,6-diisocyanatohexane (HDI), 1-isocyanato-3,3,5-trimethyl-5-isocyanatomethylcyclohexane (IPDI), tetramethylenexylylene diisocyanate (TMXDI), 4,4'-diisocyanatodicyclohexylmethane, 4,4'-diisocyanatodiphenylmethane, technical-grade mixtures thereof with 2,4-diisocyanatodiphenylmethane and, if desired, the higher homologs of these diisocyanates, 2,4-diisocyanatotoluene and technical-grade mixtures thereof with 2,6-diisocyanatotoluene. Diisocyanates of the types mentioned as examples are preferred as component a), but higher functional polyisocyanates, such as, for example, biuret-, isocyanurate- or urethane-modified polyisocyanates based on the simple diisocyanates mentioned by way of example are also suitable in principle. These derivatives generally have a molecular weight of up to 1000. The preparation of such derivatives is described, for example, in U.S. Pat. Nos. 3,124,605, 3,183,112, 3,919,218 and 4,324,879.

Suitable unsaturated fatty alcohols, which may be monounsaturated or polyunsaturated, are, in particular, those having 10 to 20 carbon atoms, such as oleyl alcohol, linoleyl alcohol or linolenyl alcohol, and the corresponding polyethylene glycol ethers containing 1 to 20, preferably 1 to 12, ethylene oxide units. The unsaturated acid esters containing one hydroxyl group are, for example, mono(meth)acrylic esters of $C_2$–$C_4$-diols, such as, for example, ethylene glycol, butanediol or 1,2-propanediol, or products of the reaction of epoxides, such as, for example, Cardura® E 10 (glycidyl versatate), with (meth) acrylic acid or with unsaturated fatty acids, for example with the fatty acids which correspond to the abovementioned fatty alcohols. Component b) may also be partial esters of such unsaturated fatty acids with polyhydroxyl compounds, such as, for example, glycerol, trimethylolpropane or pentaerythritol.

The higher functional component c), which preferably contains 3 to 6 hydroxyl and/or carboxyl groups, is preferably trimethylolpropane, trimethylolethane, glycerol, ditrimethylolpropane, pentaerythritol or dipentaerythritol, or bishydroxyalkanecarboxylic acids, such as, for example, dimethylolpropionic acid, it also being possible for mixtures of two or more of these compounds to be used.

Component d) is a linear polyethylene glycol having a number average molecular weight of from 750 to 10,000, preferably from 1000 to 6000, at least 80 mol %, preferably 100 mol %, of whose alkylene oxide units are ethylene oxide units.

The term "polyethylene glycols" is thus not intended to mean just pure polyethylene glycols whose alkylene oxide units are exclusively ethylene oxide units, but also to cover polyalkylene glycols at least 80 mol % of whose alkylene oxide units are ethylene oxide units. Such "mixed" polyalkylene glycols are formed, for example, by using mixtures of various alkylene oxides, for example ethylene oxide and propylene oxide in a molar ratio of $\geq 8:2$, in the preparation of the polyethylene glycols by alkoxylation of suitable dihydric starter molecules, such as, for example, water, ethylene glycol or propylene glycol. However, component d) preferably comprises pure polyethylene glycols.

The preparation of the hydrophilic polyurethanes according to the invention to be used as emulsifiers by reacting said starting components can be carried out in the presence or absence of solvents which are inert toward isocyanate groups, such as, for example, acetone, methyl ethyl ketone, ethyl acetate, butyl acetate or toluene, or mixtures of such solvents, reaction temperatures of from 20° to 200° C., in particular from 50° to 150° C., preferably being maintained. Components b) to d) can be reacted simultaneously or stepwise with component a).

In practice, it is thus possible, for example, to proceed by initially introducing components b) to d) and reacting them with the isocyanate a) within the abovementioned temperature ranges until the NCO content has dropped to below 0.1% by weight.

The type and mixing ratio of the starting components are always selected here within said ranges so that, based on components a) to d), an NCO/OH equivalent ratio of from 0.7:1 to 1.2:1 is ensured.

The urethane-formation reactions can be catalyzed in a manner known per se, for example using tin octanoate, dibutyltin dilaurate or tertiary amines. It is likewise possible to protect the polyurethane against premature and undesirable polymerization by addition of suitable inhibitors and antioxidants, in an amount of from 0.001 to 0.3% by weight each, based on the total mixture.

The hydrophilic, unsaturated polyurethanes obtained in this way have a molecular weight Mn (number average), which can be determined by the gel permeation chromatography method using polystyrene as standard, of from 1000 to 20,000, preferably from 2000 to 15,000, a content of olefinic double bonds (calculated as —C=C—, molecular weight=24) of at least 0.7% by weight, preferably from 1.0 to 6.0% by weight, and content of polyethylene glycol incorporated units of from 20 to 80% by weight, preferably from 30 to 75% by weight.

The hydrophilic polyurethanes are valuable emulsifiers for hydrophobic synthetic resins which can be cured by means of free radicals and/or oxidatively. These synthetic resins generally have a molecular weight Mn, which can be determined by the gel permeation chromatography method using polystyrene as standard, of from 500 to 20,000, preferably from 500 to 6000. Their content of double bonds means that these polyurethanes can be regarded as reactive emulsifiers.

These synthetic resins are preferably commercially available resins from the group consisting of alkyd resins, UV binders, polyester resins, polyacrylates, polyepoxides, etc., which may subsequently be slightly modified in order, for example, to increase their hydrolysis stability.

The hydrophobic synthetic resin to emulsifier ratio is selected so that the mixture preferably contains from 50 to 95 parts by weight, in particular from 70 to 93 parts by weight, of said hydrophobic synthetic resins mixed with preferably from 5 to 50 parts by weight, in particular from 7 to 30 parts by weight, of said hydrophilic polyurethanes acting as emulsifiers. However, it is advantageous to select the type and mixing ratios of the individual components so that the total content of ethylene oxide units originating from component d) in the water-dispersible mixtures of synthetic resin and emulsifier is at most 20% by weight, preferably at most 17% by weight. The mixtures of synthetic resin and emulsifier can be prepared by simply mixing the individual components, if desired in the presence of inert solvents of the type mentioned above by way of example.

In order to prepare the aqueous dispersions, the mixtures are dispersed in water, which can be carried out by simply stirring water into the synthetic resins by means of conventional dissolvers or other suitable stirring means or alternatively by pouring the mixture into water with vigorous stirring. If desired, some of the water can first be added to the above-described mixture and this mixture then poured into the remainder of the water with stirring. The resin can alternatively be inversely dispersed. In this way, stable oil-in-water emulsions are obtained.

The aqueous dispersions obtained in this way are a valuable component for coating compositions. They can be used, alone or in combination with the auxiliaries and additives known from paint technology such as, for example, fillers, pigments, solvents, flow-control agents and the like, for the production of coatings on substrates of all types.

Suitable substrates are paper, cardboard packaging, leather, wood, plastics, composite materials, nonwovens, films, textiles, ceramic materials, mineral materials, glass, metal, coated metal, artificial leather, photographic materials, such as, for example, paper provided with a photographic coating.

These coating compositions can be applied in a known manner by spraying, knife coating, rolling, brushing, dip-coating or pouring. After the water and any inert solvents also used have evaporated, the crosslinking of the coatings can be carried out either with the aid of high-energy radiation, such as UV light, electron beams or gamma rays, or by curing using metal salts of siccative acids and, if desired, (hydro)peroxides or other siccatives, at temperatures between room temperature and 250° C.

In the case of crosslinking by UV irradiation, it is necessary to add photoinitiators to the coating compositions. Suitable photoinitiators are the compounds usually employed, as described, for example, in Houben-Weyl, Methoden der organischen Chemie, Volume E 20, page 80 ff., Georg Thieme Verlag, Stuttgart, 1987.

Highly suitable are, for example, benzoin ethers, such as benzoin isopropyl ether, benzil ketals, such as, for example, benzil dimethyl ketal, and hydroxyalkylphenones, such as, for example, 2-hydroxy-2-methyl-1-phenylpropan-1-one.

The photoinitiators mentioned, which are employed, depending on the application of the compositions according to the invention, in amounts of between 0.1 and 10% by weight, preferably between 0.1 and 5% by weight, based on the weight of the dispersed synthetic resins, can be used alone or, if desired with utilization of the synergistic effects, in combination with one another. The metal salts of siccative acids employed in oxidative crosslinking are, for example, cobalts, lead and manganese salts of acids such as linseed oil fatty acids, tall oil fatty acids, soya oil fatty acids, of resin acids, such as abietic acid and naphthenic acid, or of acetic acid and isooctanoic acid. They are employed in such amounts that the metal content, based on the weight of the dispersed hydrophilic and hydrophobic synthetic resins, corresponds to from 0.005 to 1% by weight.

Examples of (hydro)peroxides which may be mentioned are: hydrogen peroxide, di-tert-butyl peroxide, benzoyl peroxide, cyclohexanone peroxide, methyl ethyl ketone peroxide, acetylacetone peroxide, dinonyl peroxide, bis(tert-butylcyclohexyl) peroxydicarbonate, tert-butyl hydroperoxide, cumene hydroperoxide, 2,5-dimethylhexane 2,5-hydroperoxide and diisopropylbenzene monohydroperoxide. These (hydro)peroxides are preferably employed in amounts of from 1 to 10% by weight, based on the weight of the dispersed hydrophilic and hydrophobic synthetic resins.

In the examples below, all amounts and percentages relate to the weight.

EXAMPLES

Preparation of a Binder

Example B1

870 parts of EUREPOX ® RV-C (epoxy resin, epoxide content: 9.1%), 2.5 parts of hydroquinone monomethyl ether and 6 parts of triphenylphosphine are heated to 90° C. while air is passed through, and 335 parts of acrylic acid are added over the course of 2 hours. Stirring is continued under the same conditions to an acid number of <5.

A pale yellow product having a viscosity of 6100 mPas and a double-bond content of 9.1% is obtained.

Preparation of an Emulsifier

Example E1

300 parts of polyethylene glycol (mean molecular weight 6000) and 3.4 parts of dimethylolpropionic acid are heated to 100° C. with stirring, and the water is removed by applying a water-pump vacuum. The mixture is cooled to 55° C., and 0.2 part of dibutyltin dilaurate and 84.4 parts of Sartomer 454 (commercially available triacrylate of an ethoxylated trimethylolpropane from Cray Valley) are added. 17.4 parts of tolylene diisocyanate are added dropwise over the course of 30 minutes while air is passed through; after a further 15 minutes, 16.7 parts of a product of the reaction of 12.9 parts of Cardura ® E10 (commercially available glycidyl ester of Versatic acid from SHELL) and 3.8 parts of acrylic acid are added dropwise. Stirring is then continued at the same temperature until an NCO content of <0.1% has been reached. 0.3 part of hydroquinone monomethyl ether is added, and the mixture is then diluted with 927 parts of water.

A turbid emulsifier solution having a viscosity of 1200 mPas and a pH of 3.8 is obtained.

Example E2

55 g of linseed oil fatty acid and 51 g of Cardura ® E10 are reacted at 120° C. (catalyst:chromium octanoate) until an acid number of <1 has been reached (raw material (III)).

40.2 g of dimethylolpropionic acid are dissolved at about 80° C. in 400 g of polyethylene glycol 2000. 162 g of Solvesso 100 and raw material III are added to the solution. The mixture is warmed to 70° C., and 104.4 g of tolylene diisocyanate are then added dropwise at such a rate that a temperature of 75° C. is not exceeded (about 30 minutes). When all the TDI has been added dropwise, the temperature is maintained until the isocyanate content has dropped to <0.1%.

A yellowish, viscous resin is obtained.

Example E3

112 g of soya oil fatty acid are esterified by means of 26.8 g of trimethylolpropane using dibutyltin oxide as catalyst at temperatures of up to 260° C. until an acid number of <2 has been reached. After cooling, 1200 g of polyethylene glycol 6000, 13.4 g of dimethylolpropionic acid and 355 g of Solvesso 100 are added, and the mixture is warmed to 70° C. 69.6 g of tolylene diisocyanate are then added dropwise at such a rate that the temperature does not rise above 75° C. When the addition is complete, the reaction mixture is held at the temperature until the NCO content has dropped to <0.1%.

A brownish, viscous resin is obtained.

Example E4

35.4 g of Genapol ® O-020 (unsaturated fatty alcohol diethylene glycol ether) is warmed to 70° C. with 400 g of polyethylene glycol 4000 and 6.7 g of dimethylolpropionic acid, and the mixture is stirred for 15 minutes. 119 g of Solvesso are then added, and 34.8 g of tolylene diisocyanate are added dropwise at such a rate that the temperature does not rise above 75° C. The reaction mixture is kept at 70° C. until an NCO content of <0.1% has been reached.

A yellowish, viscous resin is obtained.

Preparation of a Dispersion

Example D1

1610 parts of binder B1 are heated to 40° C. with 560 parts of emulsifier E1 with stirring, and are homogenized. 380 parts of water are introduced over the course of 5 minutes with stirring using a dissolver (U=20 m/sec). After stirring for 15 minutes, the dispersion is cooled to room temperature and diluted with 950 parts of water.

A white, milky dispersion having a viscosity of 350 mPas and a pH of 3.9 is obtained.

Example D2

In each case, 37 g of one of the emulsifiers described above are added to 200 g of a commercially available alkyd resin (Alftalat An 650, 100%), and the mixture is stirred for about 30 minutes at 70° C. until homogeneous.

3 ml of ammonia water (25%) are added, and 345 g of demineralized water at 70° C. are added dropwise very slowly with vigorous stirring (about 3 hours).

In each case, a milky, psuedoplastic dispersion is obtained.

Example D3

100 parts of a 70% strength solution of a commercially available hydroxyl-containing acrylate resin (OH number: 145, viscosity of a 60% strength solution in butylacetate: 780 mPas) are treated at 50° C. with 11 parts of an 80% strength solution of emulsifier E1, and the mixture is homogenized.

80 parts of water are introduced over the course of 5 minutes with stirring using a dissolver (U=20 m/sec). After stirring for 15 minutes, the dispersion is slowly cooled to room temperature with stirring and addition of a further 72 parts of water.

A white, milky dispersion having a viscosity of 350 mPas and a pH of 2.5 is obtained.

We claim:

1. An unsaturated polyurethane which contains from 20 to 80% by weight of polyethylene glycol units and can be prepared by reacting
    a) at least one organic polyisocyanate,
    b) an unsaturated fatty alcohol, a polyalkylene glycol ether thereof or an unsaturated acid ester containing one hydroxyl group,
    c) one or more diols which additionally contain at least one further hydroxyl group or carboxyl group and
    d) a polyethylene glycol having a molecular weight in the range from 750 to 10,000, with maintenance of an NCO/OH equivalent ratio, based on all the starting components a) to d), of from 0.7:1 to 1.2:1.

2. A polyurethane as claimed in claim 1, wherein component b) is polyunsaturated.

3. A polyurethane as claimed in claim 1, wherein component b) is a (meth)acrylate of a diol.

4. A polyurethane as claimed in claim 1, wherein component b) is a polyethylene glycol ether of an unsaturated $C_{10}$-$C_{20}$-fatty alcohol.

5. A polyurethane as claimed in claim 1, wherein component b) is a product of the reaction of an unsaturated fatty acid with glycidyl versatate.

6. A polyurethane as claimed in claim 1, wherein the higher-functional component c) is a bishydroxyalkane carboxylic acid.

7. The use of a polyurethane of claim 1 as reactive emulsifier for hydrophobic synthetic resins which can be cured by means of free radicals and/or oxidatively, in the preparation of aqueous synthetic resin dispersions.

8. An aqueous dispersion of hydrophobic synthetic resins which can be cured by means of free radicals and/or oxdidatively, which contains an unsaturated polyurethane as claimed in claim 1.

* * * * *